US008870702B2

(12) United States Patent
Kii et al.

(10) Patent No.: US 8,870,702 B2
(45) Date of Patent: Oct. 28, 2014

(54) POWER SWITCHING DEVICE FOR VEHICLES (75) Inventors: Hideaki Kii, Kakogawa (JP); Seiji Itoo, Akashi (JP); Ayumi Hamada, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 427 days.

(21) Appl. No.: 13/340,836

(22) Filed: Dec. 30, 2011

(65) Prior Publication Data

US 2013/0167681 A1    Jul. 4, 2013

(51) Int. Cl.
 *F16H 48/20* (2012.01)
(52) U.S. Cl.
 USPC ............................ 475/231; 475/249; 475/199
(58) Field of Classification Search
 CPC .... B60K 17/346; B60K 23/08; F16H 63/304; F16H 2063/3056; F16H 2048/343
 See application file for complete search history.

(56) References Cited

U.S. PATENT DOCUMENTS

| 4,462,271 | A  | * | 7/1984  | Stieg .............................. 475/86 |
| 5,411,110 | A  | * | 5/1995  | Wilson et al. ................. 180/247 |
| 5,853,342 | A  | * | 12/1998 | Pritchard et al. .............. 475/206 |
| 7,101,304 | B2 | * | 9/2006  | Swanson et al. .............. 475/295 |
| 7,951,038 | B2 | * | 5/2011  | Ina et al. ....................... 475/231 |
| 2006/0032692 | A1 | * | 2/2006 | Ima et al. ...................... 180/249 |

FOREIGN PATENT DOCUMENTS

JP     2011-121458     6/2011

* cited by examiner

*Primary Examiner* — David D Le
(74) *Attorney, Agent, or Firm* — Wenderoth, Lind & Ponack, L.L.P.

(57) ABSTRACT

A power switching device for vehicle has an engaging mechanism for connecting and disconnecting between a pair of rotating members arranged on a driving force transmission passage, an operating mechanism for switch-operating the engaging mechanism, an electric actuator, and a waiting mechanism having an elastic member. The elastic member is incorporated into the waiting mechanism so that the elastic member can temporarily accumulate the operating power only when the engaging mechanism is switched to the engaged condition.

10 Claims, 10 Drawing Sheets

Fig. 1

Fig. 2
Second Position

First Position

Fig.7

Second Position

Fig.8
Third Position

Fig. 9

First Position

Fig. 10

Waiting (First Position)

Fig. 11

Second Position

Fig. 12

Waiting (Second Position)

Fig. 13

Third Position

POWER SWITCHING DEVICE FOR VEHICLES

BACKGROUND OF THE INVENTION

1. Technical Field of the Invention

The present invention relates to a power switching device for a vehicle arranged on a driving force transmission passage from a driving source to wheels of a vehicle.

2. Description of the Prior Art

The power switching device typically has an engaging mechanism for connecting and disconnecting between a pair of rotating members arranged on the driving force transmission passage, an operating mechanism for switch-operating the engaging mechanism between an engaged condition and a disengaged condition, an electric actuator for providing operating power to the operating mechanism, and a waiting mechanism having an elastic member for temporarily accumulating the operating power and then transmitting the operating power to the engaging mechanism. Japanese Patent Application Laid-Open (JP-A) No. 2011-121458 discloses a differential device for rear wheels having a differential lock mechanism with the waiting mechanism.

In the waiting mechanism described in the conventional art document, a coil spring is disposed on an operating power transmission passage from an electric actuator to a shift sleeve of the differential lock mechanism so that the coil spring can temporarily accumulate operating power from the electric actuator. The coil spring for the waiting mechanism can accumulate the operating power at the time of any of an engaging operation for moving the shift sleeve of the differential lock mechanism into a lock position (connecting operation for driving force) and a releasing operation for moving the shift sleeve into an unlock position (disconnecting operation for driving force).

SUMMARY OF THE INVENTION

The present invention provides a power switching device for a vehicle in which operating power can be temporarily accumulated by a waiting mechanism only at the time of a connecting operation for driving force or driving power, thereby reducing an electric motor and the waiting mechanism in size, and driving force can be disconnected immediately at the time of a disconnecting operation for driving force.

In other words, the present invention provides a power switching device for a vehicle, and the device has an engaging mechanism for connecting and disconnecting between a pair of rotating members arranged on a driving force or driving power transmission passage from a driving source to wheels. In addition, the device has an operating mechanism for switch-operating the engaging mechanism between an engaged condition and a disengaged condition, an electric actuator for providing operating power to the operating mechanism, and a waiting mechanism having an elastic member for temporarily accumulating the operating power and then transmitting the operating power to the engaging mechanism. The engaging mechanism has a pair of engage portions provided on respective rotating members, and is switched between the engaged condition and the disengaged condition by moving one of the engage portions relative to the other engage portion in an axial direction of the rotating member. The elastic member is incorporated into the waiting mechanism so that the elastic member can temporarily accumulate the operating power only when the engaging mechanism is switched from the disengaged condition to the engaged condition.

According to the present invention, the waiting mechanism acts only when the engaging mechanism is switch-operated from the disengaged condition to the engaged condition, so that the electric actuator and the elastic member for the waiting mechanism can be reduced in volume and size and the entire power switching device can also be reduced in size. In addition, when the engaging mechanism is switched from the engaged condition to the disengaged condition, the operating power is not accumulated by the elastic member, so that a quick-response and immediate operation can be performed.

The above invention can have the following features.

(a) The engaging mechanism is a differential lock mechanism provided in a differential device for front wheels or rear wheels, and the engaging mechanism brings the differential device into a locked condition when the engaging mechanism is in the engaged condition and brings the differential device into an unlocked condition when the engaging mechanism is in the disengaged condition. In this case, the pair of engage portions of the engaging mechanism are e.g., inner spline teeth and outer spline teeth.

With the above configuration, the lock operation of the differential lock mechanism can be smoothly performed by the waiting action, and on the other hand, the unlock operation that does not produce the waiting action can be performed immediately. In this case, when the inner spline teeth and the outer spline teeth are formed as the pair of engage portions, a relative rotation angle between the inner spline teeth and the outer spline teeth necessary for lock at the time of the waiting action can be smaller, so that a smooth switching operation can be ensured.

(b) The pair of rotating members are a differential case of the differential device and one of right and left axles.

(c) The engaging mechanism is a two-wheel-drive/four-wheel-drive switching mechanism arranged between a propeller shaft for front wheels or rear wheels and a final reduction gear for front wheels or rear wheels, and the engaging mechanism brings the vehicle into a four-wheel-drive condition when the engaging mechanism is in the engaged condition and brings the vehicle into a two-wheel-drive condition when the engaging mechanism is in the disengaged condition. In this case, the pair of engage portions of the engaging mechanism are e.g., a pair of dog teeth projecting in an axial direction.

With the above configuration, the switching operation from the two-wheel-drive condition to the four-wheel-drive condition can be smoothly performed by the waiting action. At the time of switching from the four-wheel-drive condition to the two-wheel-drive condition, the waiting action is not exerted, so that the four-wheel-drive condition can be switched immediately to the two-wheel-drive condition.

(d) Two mechanisms of the differential lock mechanism and the two-wheel-drive/four-wheel-drive switching mechanism are provided as the engaging mechanism, and the operating mechanism branches the operating power transmitted from the single electric actuator into the differential lock mechanism and the two-wheel-drive/four-wheel-drive switching mechanism.

In this case, the operating mechanism has a shift lever having a first guide groove for engaging with a shift member for moving one of the engage portions of the differential lock mechanism and a second guide groove for moving one of the engage portions of the two-wheel-drive/four-wheel-drive switching mechanism, and one of both the guide grooves is formed on an end face in a radial direction of the shift lever and the other guide groove is formed on an end face in an axial direction of the shift lever.

With the above configuration, the differential lock mechanism and the two-wheel-drive/four-wheel-drive switching mechanism can be switch-operated by the single electric actuator, so that the number of components for the power switching device can be reduced. In this case, since the single shift lever having the first guide groove for operating the differential lock mechanism and the second guide groove for switching between the two-wheel-drive condition and the four-wheel-drive condition is provided, the operating mechanism can be smaller and the number of components can be reduced.

(e) The elastic member of the waiting mechanism is a coil spring. The coil spring is arranged between a drive cylindrical shaft coupled to an output shaft of the electric actuator and a driven cylindrical shaft coupled to a rotational shaft of the operating mechanism so as to be substantially coaxial with these cylindrical shafts.

In this case, for instance, the drive cylindrical shaft is arranged inside the driven cylindrical shaft.

In addition, of the drive cylindrical shaft and the driven cylindrical shaft, one of the cylindrical shafts is formed with an arcuate notch about a cylindrical shaft axis and the other cylindrical shaft is formed with a projection for engaging with the notch so as to be movable in a circumferential direction, and only when the drive cylindrical shaft is operated from the disengaged condition to the engaged condition, the projection and the notch are relatively moved in the circumferential direction to compress the coil spring.

With the above configuration, the pair of cylindrical shafts and the coil spring are arranged so as to be substantially coaxial with each other, so that the waiting mechanism can be smaller. In addition, when a direction in which the waiting action is exerted by the coil spring is regulated by the arcuate notch and the projection, the configuration can be simplified.

(f) The waiting mechanism is arranged outside the electric actuator.

With the above configuration, a general-purpose product can be used as the electric actuator.

(g) A potentiometer for detecting the amount of rotation is provided on a rotating member arranged in the electric actuator.

With the above configuration, the amount of operation from the electric actuator to the waiting mechanism can be easily detected.

(h) Three rotation position sensors opposite the shift lever from outside in the radial direction are provided, and as the three rotation position sensors, a first rotation position sensor for detecting a rotation position of the shift lever when the two-wheel-drive/four-wheel-drive switching mechanism is in the two-wheel-drive condition and the differential mechanism is in the unlocked condition, a second rotation position sensor for detecting a rotation position of the shift lever when the two-wheel-drive/four-wheel-drive switching mechanism is in the four-wheel-drive condition and the differential mechanism is in the unlocked condition, and a third rotation position sensor for detecting a rotation position of the shift lever when the two-wheel-drive/four-wheel-drive switching mechanism is in the four-wheel-drive condition and the differential mechanism is in the locked condition are provided.

With the above configuration, the first, second, third rotation position sensors that can individually detect the three rotation positions of the shift lever are provided, so that the three conditions of the differential lock mechanism and the two-wheel-drive/four-wheel-drive switching mechanism can be precisely detected.

BRIEF DESCRIPTION OF THE DRAWINGS

The above object, features, and advantages of the present invention will be more apparent from the following description in connection with the accompanying drawings.

DETAILED DESCRIPTION OF THE PREFERRED EMBODIMENTS

[First Embodiment]

FIGS. 1 to 13 show an embodiment of a power switching device for a vehicle according to the present invention, and the embodiment of the present invention will be described with reference to these drawings. It should be noted that in the embodiment, as an engaging mechanism of the power switching device according to the present invention, a differential lock mechanism 39 (FIG. 2) and a two-wheel-drive/four-wheel-drive switching mechanism 31 (FIG. 2) are provided.

Figure 1:
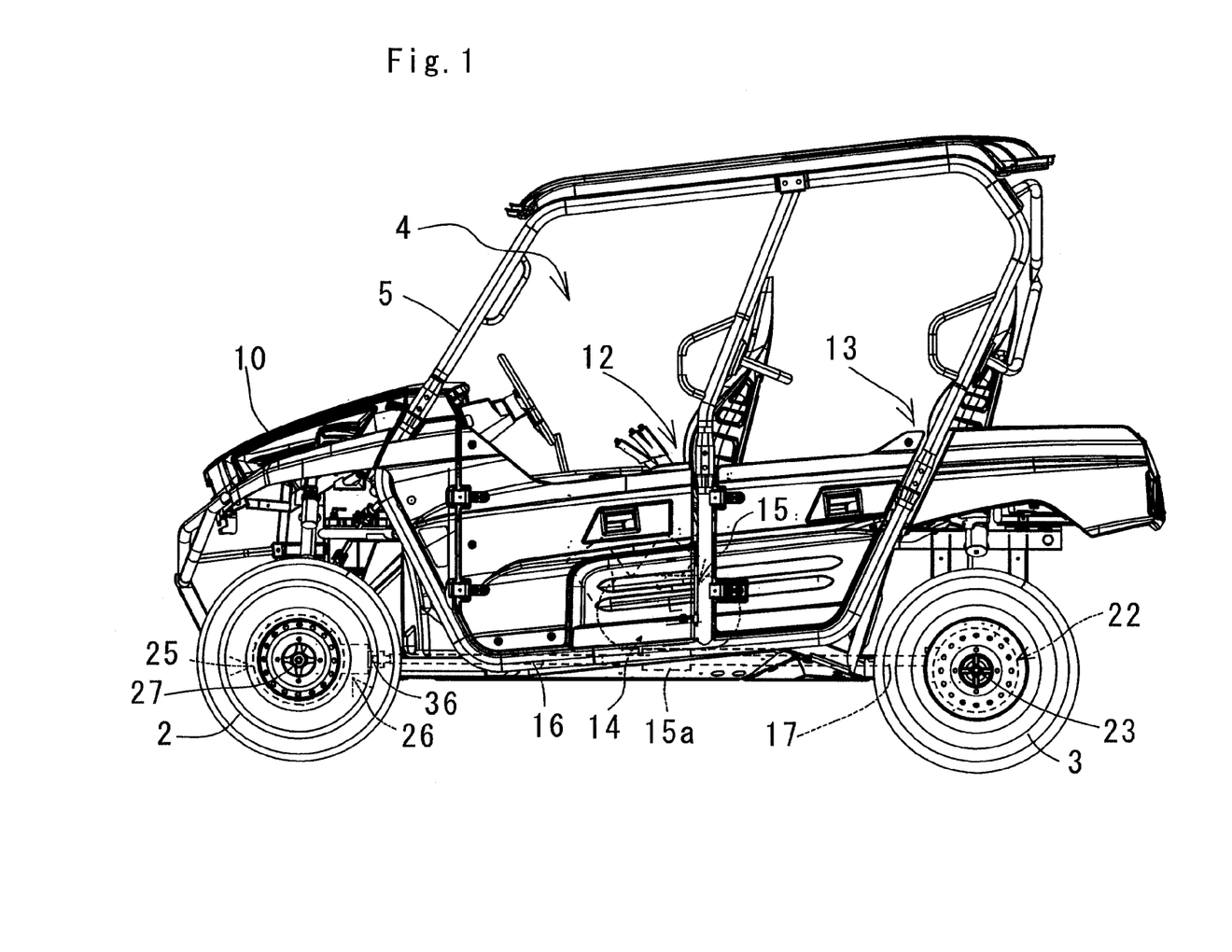
FIG. 1 is a left side view of a utility vehicle having a power switching device for vehicle according to the present invention.

FIG. 1 is a left side view of a utility vehicle having the power switching device for a vehicle according to the present invention, and in FIG. 1, the utility vehicle has a pair of right and left front wheels 2 in a front portion of a vehicle body, a pair of right and left rear wheels 3 in a rear portion of the vehicle body, and a riding space (cabin) 4 between the front wheels 2 and the rear wheels 3, the riding space 4 being surrounded by a ROPS 5. Further, a hood 10 is provided in front of the riding space 4. A front seat 12 is provided in a front half portion of the riding space 4, a rear seat 13 is provided in a rear half portion of the riding space 4, and an engine 14 is provided as a driving source for driving the vehicle on a lower side of the front seat 12 (a lower side between a driver's seat and a front passenger's seat).

The engine 14 has a transmission 15. A propeller shaft 16 for front wheels extending forward and a propeller shaft 17 for rear wheels extending rearward are connected to a power take-off portion 15a at a lower end of the transmission 15. A rear end of the propeller shaft for rear wheels 17 is coupled to right and left rear axles 23 via a final reduction gear for rear wheels 22. A front end of the propeller shaft for front wheels 16 is coupled to right and left front axles 27 via a universal joint 36 and a final reduction gear for front wheels 26 having a differential device for front wheels 25.

Figure 2:
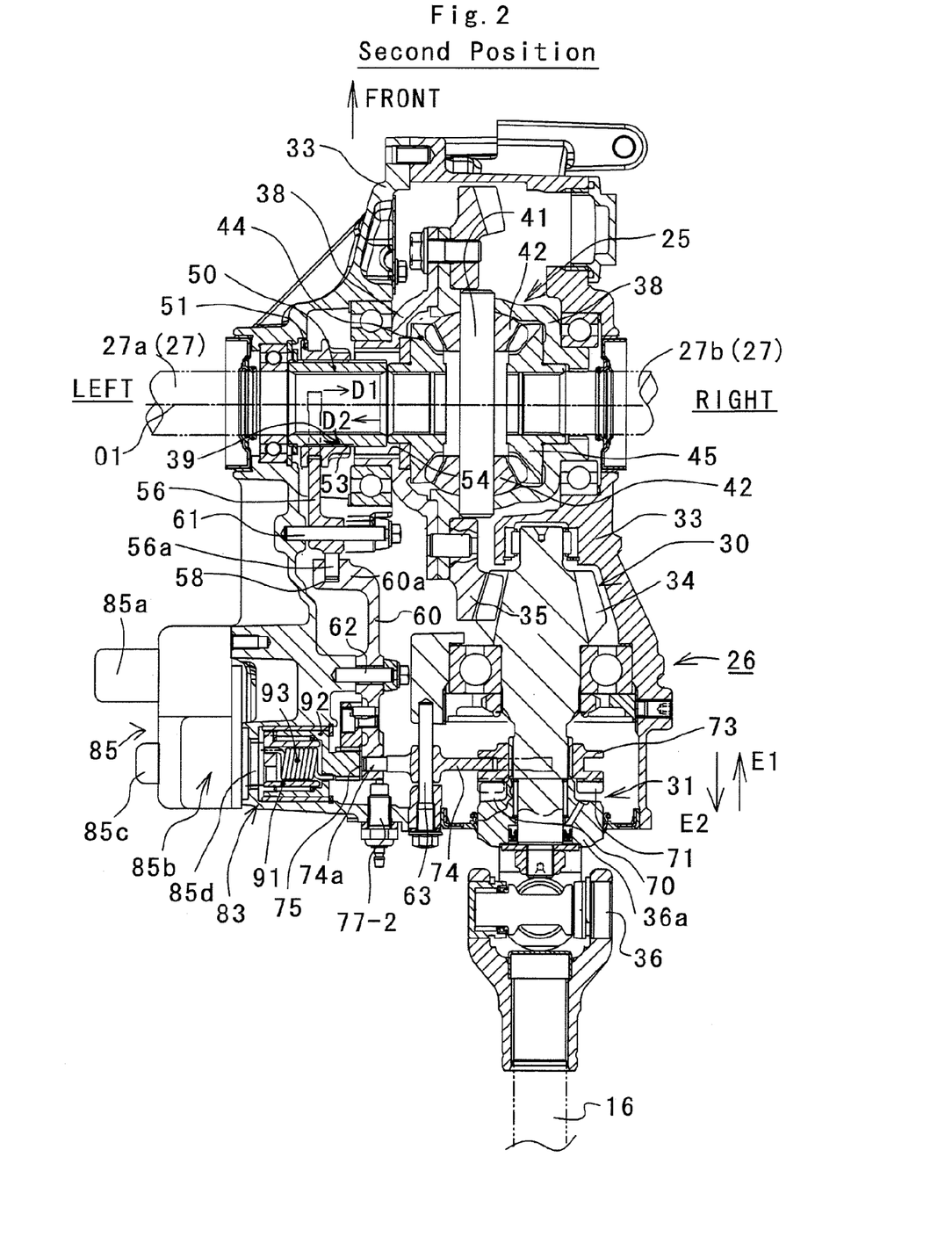
FIG. 2 is a horizontal sectional view of a final reduction gear for front wheels of FIG. 1.
Figure 3:
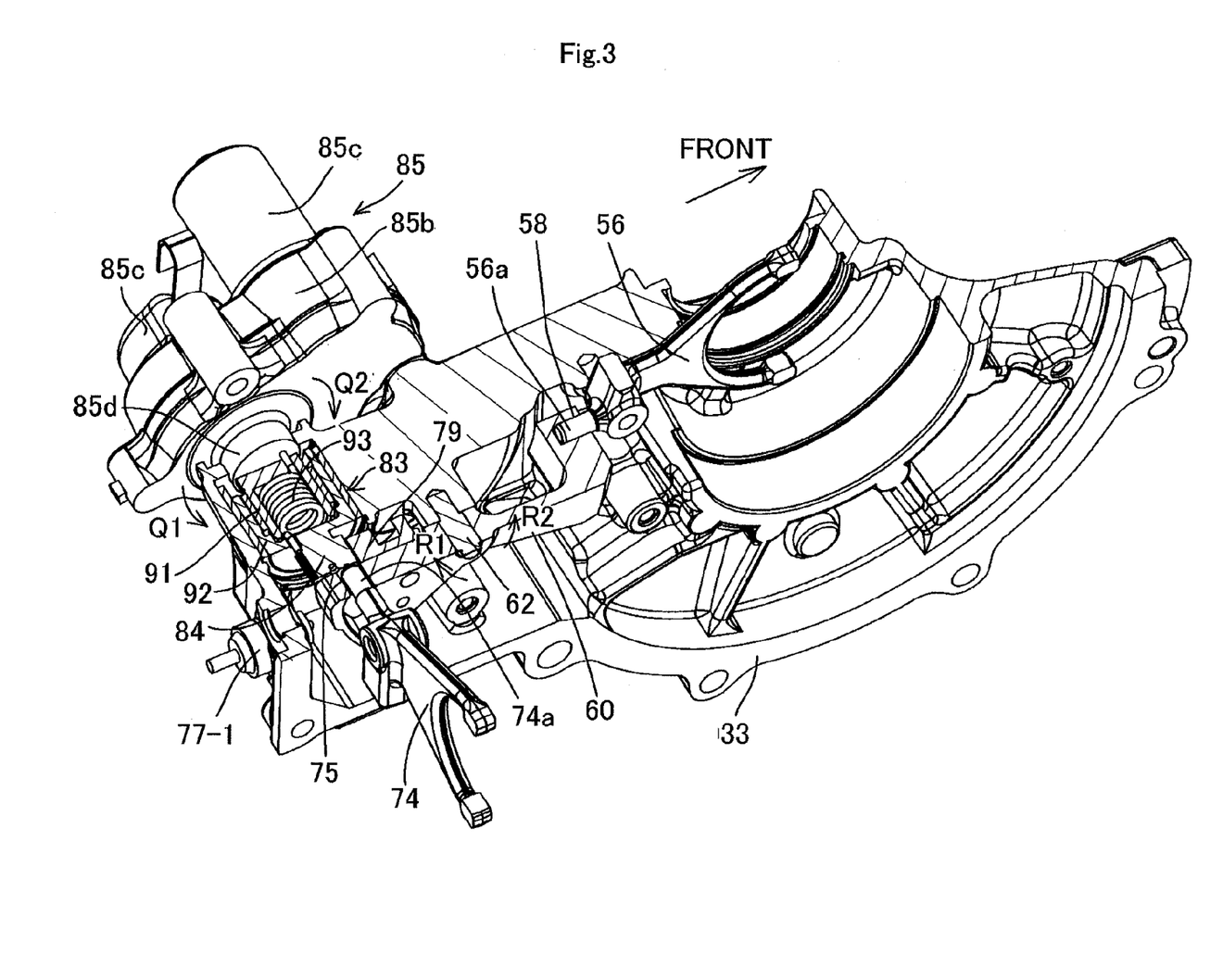
FIG. 3 is an enlarged section perspective view of an operating mechanism of FIG. 2.

FIG. 2 is a horizontal sectional view of the final reduction gear for front wheels 26 of FIG. 1, and FIG. 3 is an enlarged section perspective view of an operating mechanism in the final reduction gear for front wheels 26 of FIG. 2. In FIG. 2, in a reduction gear case 33 of the final reduction gear 26 for front wheels, the differential device 25 for front wheels, a final reduction gear mechanism 30 for front wheels, the two-wheel-drive/four-wheel-drive switching mechanism 31, and the differential lock mechanism 39 for front wheels are arranged. It should be noted that the reduction gear case 33 has a case body and a case cover, which are indicated by the same reference numeral "33".

The final reduction gear mechanism 30 has an input pinion 34 extending in a front-rear direction and a large-diameter ring gear 35. A rear end of a shaft portion of the input pinion 34 is connected to the universal joint 36 via the two-wheel-drive/four-wheel-drive switching mechanism 31. A rear end of the universal joint 36 is spline-fitted to a front end of the propeller shaft 16 for front wheels. The ring gear 35 is coupled to a differential case 38 of the differential device 25 and is rotated about a front axle axis O1 so as to be integral with the differential case 38.

The differential device 25 has the differential case 38, a support shaft 41 fixed to the differential case 38, a pair of differential gears 42 rotatably supported by the support shaft 41, and a left side gear 44 and a right side gear 45 for engaging with both the differential gears 42. A right front axle 27b is spline-fitted to the right side gear 45, and a left front axle 27a is spline-fitted to the left side gear 44. In the embodiment, the differential lock mechanism 39 is provided between the left front axle 27a and the differential case 38. In other words, the differential lock mechanism 39 directly couples the differential case 38 and the left front axle 27a to bring the differential device 25 into a locked condition.

[Differential Lock Mechanism 39]

The differential lock mechanism 39 has inner spline teeth 54 formed on an inner circumferential surface of a boss portion at a left end of the differential case 38, and outer spline teeth 53 formed on an outer circumferential surface of a first shift sleeve 51 movable in a front axle direction. The first shift sleeve 51 is spline-fitted to an outer circumferential surface of a coupling sleeve 50 fixed to a right end of the left front axle 27a so as to be movable in the front axle direction.

A condition of the differential lock mechanism 39 of FIG. 2 is a condition in which the first shift sleeve 51 is located in an unlock position, and the outer spline teeth 53 disengage from the inner spline teeth 54. The first shift sleeve 51 in the unlock position of FIG. 2 is moved in a direction indicated by an arrow D1 (rightward), so that the outer spline teeth 53 engage with the inner spline teeth 54 to lock the differential device 25 for front wheels.

As the operating mechanism for moving the first shift sleeve 51 in the front axle direction, a first shift fork 56 for engaging with an outer circumference annular groove of the first shift sleeve 51 and a shift lever 60 having a first guide groove 58 for engaging with a first drive pin 56a of the first shift fork 56 are provided. The first shift fork 56 is supported by a first shift support shaft 61 arranged in parallel with the front axle 27 so as to be movable in a shift axial direction. The shift lever 60 is rotatably supported by a lever support shaft 62 fixed to the reduction gear case 33. The shift lever 60 is also used as the operating mechanism of the two-wheel-drive/four-wheel-drive switching mechanism 31.

A partially cylindrical end 60a projecting leftward is formed at a front end of the shift lever 60, and the first guide groove 58 with which the first drive pin 56a of the first shift fork 56 engages is formed on a front end face of the partially cylindrical end 60a.

[Two-Wheel-Drive/Four-Wheel-Drive Switching Mechanism 31]

The two-wheel-drive/four-wheel-drive switching mechanism 31 has drive dog teeth 70 and driven dog teeth 71 opposite to each other in the front-rear direction. The driven dog teeth 71 are formed on a rear end face of a second shift sleeve 73 and project rearward, and the second shift sleeve 73 is spline-fitted to an outer circumferential surface at the rear end of the shaft portion of the input pinion 34 so as to be movable in the front-rear direction. The drive dog teeth 70 are formed on a front end face of a boss member 36a coupled to a front end of the universal joint 36 and project forward.

As the operating mechanism for moving the second shift sleeve 73 in the front-rear direction, a second shift fork 74 for engaging with an outer circumference annular groove of the second shift sleeve 73 is provided. The second shift fork 74 is supported by a second shift support shaft 63 fixed to the reduction gear case 33 and extending in the front-rear direction so as to be movable in the front-rear direction, and a second drive pin 74a of the second shift fork 74 engages with a second guide groove 75 formed at a rear end of the shared shift lever 60.

The second shift sleeve 73 of FIG. 2 is located in a four-wheel-drive position, and when the second shift sleeve 73 is moved from the four-wheel-drive position in a direction indicated by an arrow E1 (forward) to reach a two-wheel-drive position, engagement of both the dog teeth 70 and 71 is released, so that the two-wheel-drive/four-wheel-drive switching mechanism 31 is brought into a two-wheel-drive condition (rear-wheel-drive condition).

[The Configurations of the Shared Operating Mechanism and an Electric Actuator 85]

Figure 6:
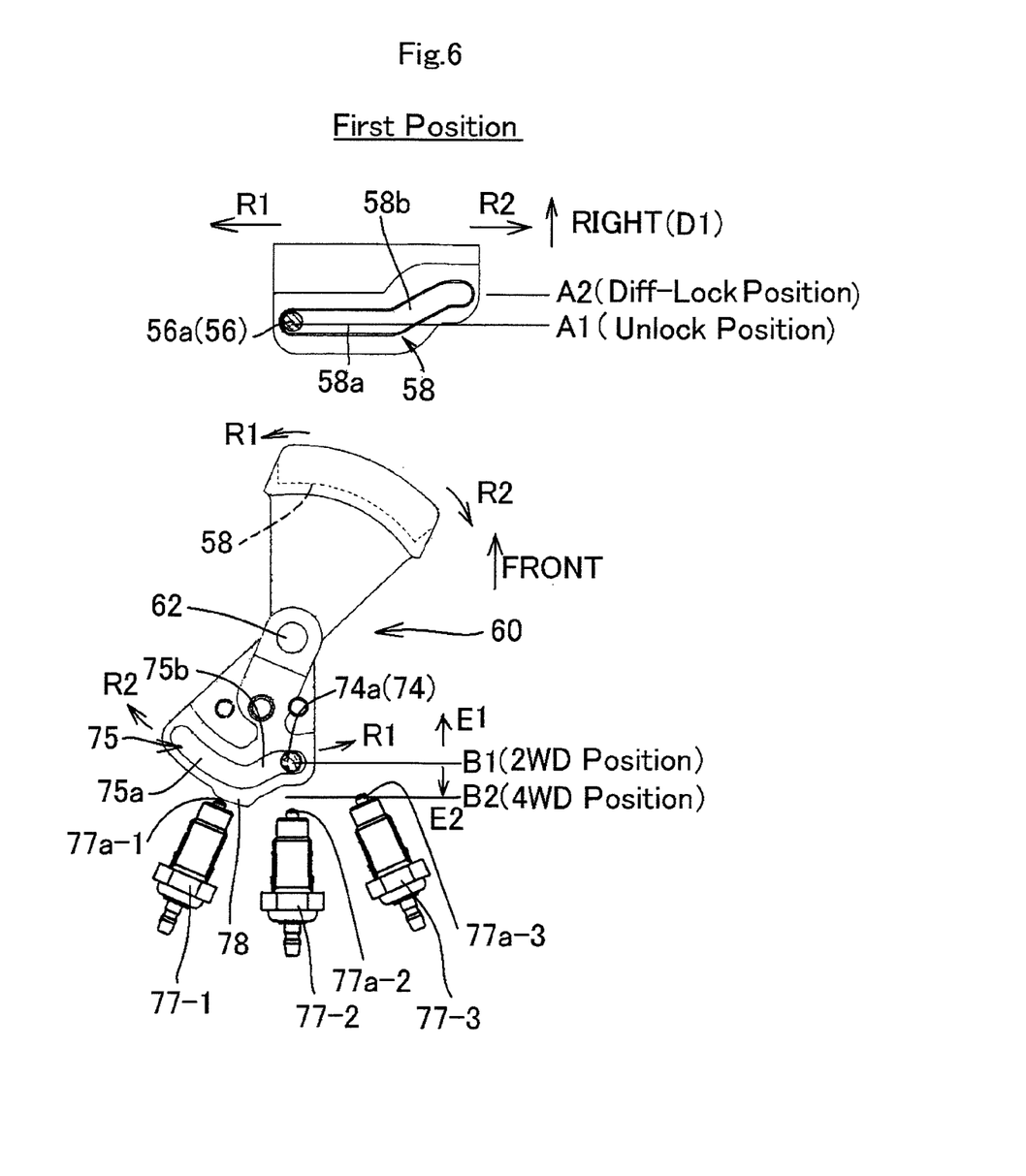
FIG. 6 is a side view of a shift lever when a two-wheel-drive/four-wheel-drive switching mechanism is in a two-wheel-drive condition and a differential lock mechanism is in an unlocked condition (a first position)
Figure 7:
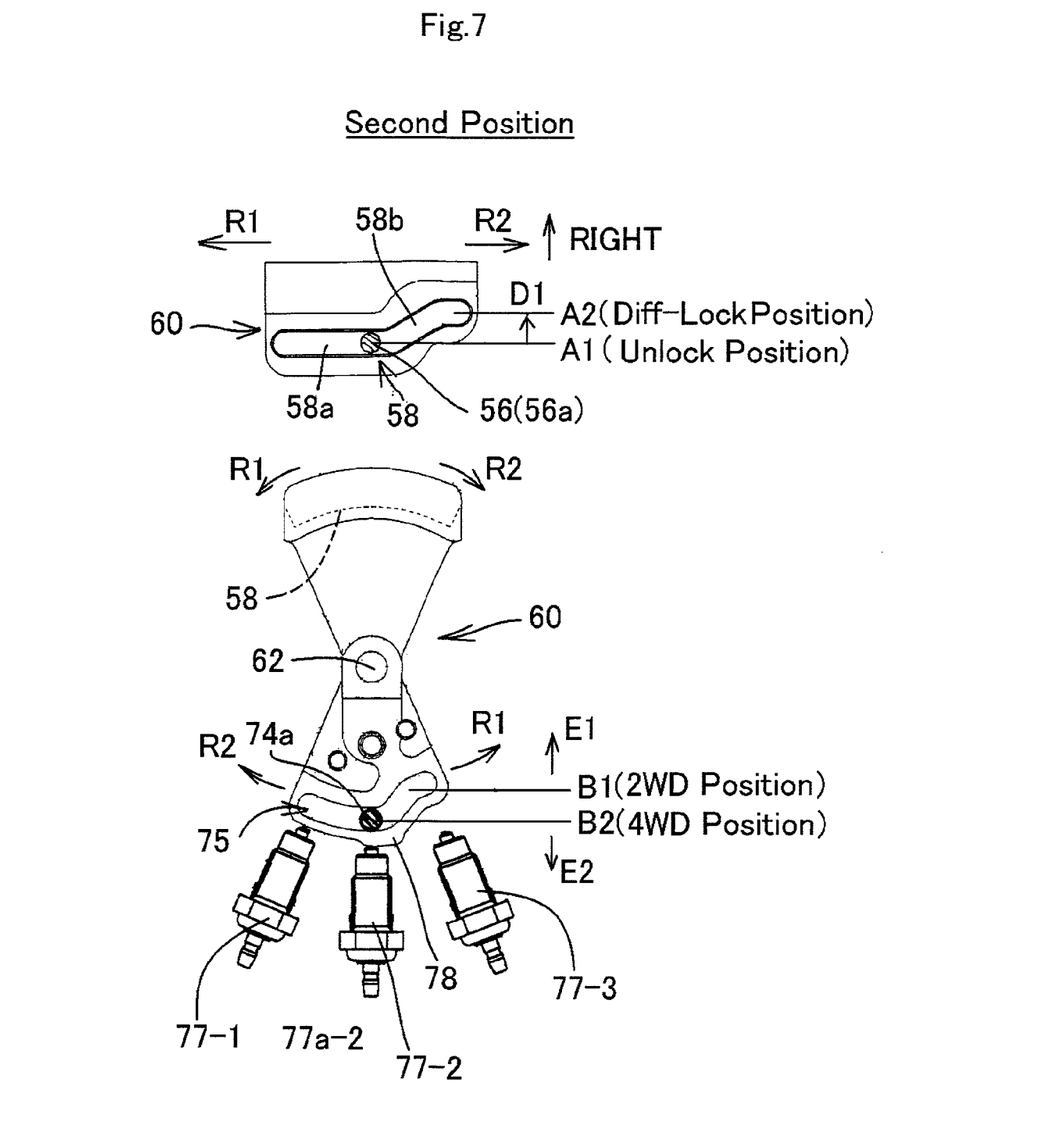
FIG. 7 is a side view of the shift lever when the two-wheel-drive/four-wheel-drive switching mechanism is in a four-wheel-drive condition and the differential lock mechanism is in the unlocked condition (a second position)
Figure 8:
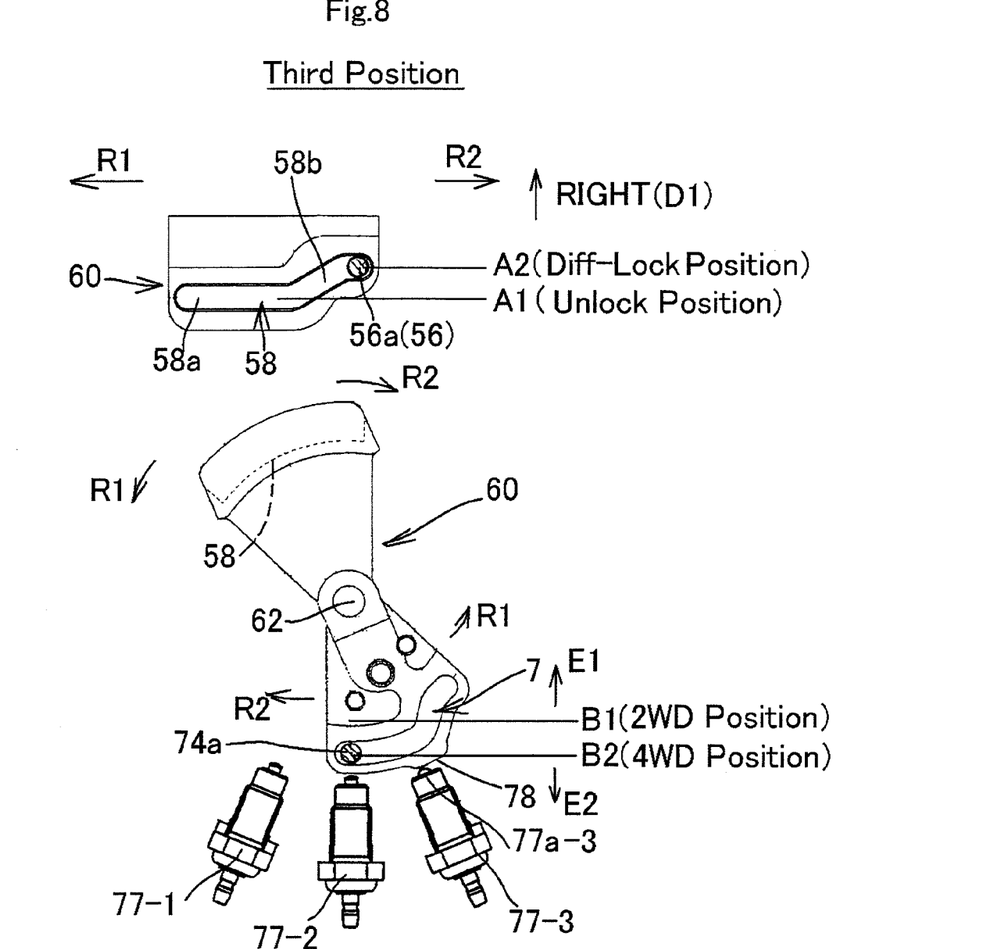
FIG. 8 is a side view of the shift lever when the two-wheel-drive/four-wheel-drive switching mechanism is in the four-wheel-drive condition and the differential lock mechanism is in a locked condition (a third position)

The shared shift lever 60 is rotated about the lever support shaft 62 and can be switched between a first position shown in FIG. 6 (the two-wheel-drive and unlock position), a second position shown in FIG. 7 (the four-wheel-drive and unlock position), and a third position shown in FIG. 8 (the four-wheel-drive and lock position). It should be noted that FIGS. 6 to 8 correspond to side views of the shift lever 60 seen from left and front views of a front end face of the shift lever 60 are also shown above the respective side views.

In FIG. 6, the first guide groove 58 of the shift lever 60 with which the first drive pin 56a engages has a first groove portion 58a extending along a circumferential direction of the shift lever 60, and a second groove portion 58b inclining from an end of the first groove portion 58a in the direction indicated by the arrow D1 (rightward). In the first and second positions of the shift lever 60 of FIGS. 6 and 7, the first drive pin 56a is located in an unlock position A1, and in the third position of FIG. 8, the first drive pin 56a is located in a lock position A2.

In FIG. 6, the second guide groove 75 of the shift lever 60 with which the second drive pin 74a engages has a first groove portion 75a extending along the circumferential direction of the shift lever 60, and a second groove portion 75b inclining from an end of the first groove portion 75a to the lever support shaft 62 side. In the first position of FIG. 6, the second drive pin 74a is located in a two-wheel-drive position B1, and in the second and third positions of FIGS. 7 and 8, the second drive pin 74a is located in a four-wheel-drive position B2.

In other words, when the shift lever 60 is in the first position of FIG. 6, the two-wheel-drive/four-wheel-drive switching mechanism 31 of FIG. 2 is brought into the two-wheel-drive condition and the differential lock mechanism 39 is brought into the unlocked condition. When the shift lever 60 is in the second position of FIG. 7, the two-wheel-drive/four-wheel-drive switching mechanism 31 of FIG. 2 is brought into the four-wheel-drive condition and the differential lock mechanism 39 is brought into the unlocked condition. When the shift lever 60 is in the third position of FIG. 8, the two-wheel-drive/four-wheel-drive switching mechanism 31 of FIG. 2 is brought into the four-wheel-drive condition and the differential lock mechanism 39 is brought into the locked condition.

In addition, three contact type position sensors 77-1, 77-2, and 77-3 are spaced in the circumferential direction so as to be opposite to a rear end face of the shift lever 60. On the other hand, a projection 78 for position detection abuttable onto ends of detection pins 77a-1, 77a-2, and 77a-3 of the three position sensors 77-1, 77-2, and 77-3 is formed on the rear end face of the shift lever 60. In other words, when the shift lever 60 is in the first position of FIG. 6, the projection 78 is brought into contact with the detection pin 77a-1 of the first position sensor 77-1, and with this, a meter of the driver's seat displays with a lamp that the shift lever 60 is in the first position (the two-wheel-drive and unlocked condition). When the shift lever 60 is in the second position of FIG. 7, the projection 78 is brought into contact with the detection pin 77a-2 of the second position sensor 77-2, and with this, the meter of the driver's seat displays with a lamp that the shift lever 60 is in the second position (the four-wheel-drive and unlocked condition). When the shift lever 60 is in the third position of FIG. 8, the projection 78 is brought into contact with the detection pin 77a-3 of the third position sensor 77-3, and with this, the meter of the driver's seat displays with a lamp that the shift lever 60 is in the third position (the four-wheel-drive and locked condition).

In FIG. 3, a sector gear 79 is fixed to a left side surface of the shared shift lever 60 having the first and second guide grooves 58 and 75, and engages with an output gear 84 of a waiting mechanism 83. An input portion of the waiting mechanism 83 is coupled to an output shaft 85d of the electric actuator 85. In other words, the shift lever 60 is rotated about the lever support shaft 62 via the waiting mechanism 83 by operating power (rotating force) generated in the electric actuator 85 to operate the differential lock mechanism 39 of FIG. 2 and the two-wheel-drive/four-wheel-drive switching mechanism 31.

In FIG. 3, the electric actuator 85 is attached to a left side surface of the reduction gear case 33, and is provided therein with an electric motor 85a, a reduction gear mechanism 85b having a plurality of reduction gears, and a potentiometer 85c attached to an end of any rotational shaft of the reduction gear mechanism 85b (e.g., the output shaft 85d on the most downstream side of driving force).

[The Configuration of the Waiting Mechanism 83]

Figure 4:
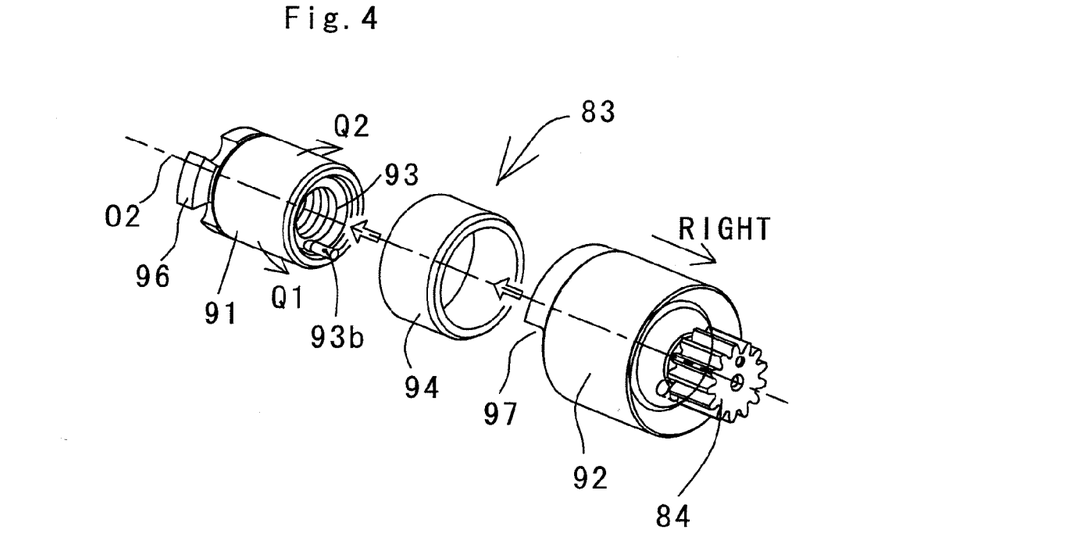
FIG. 4 is an exploded perspective view of a waiting mechanism.
Figure 5:
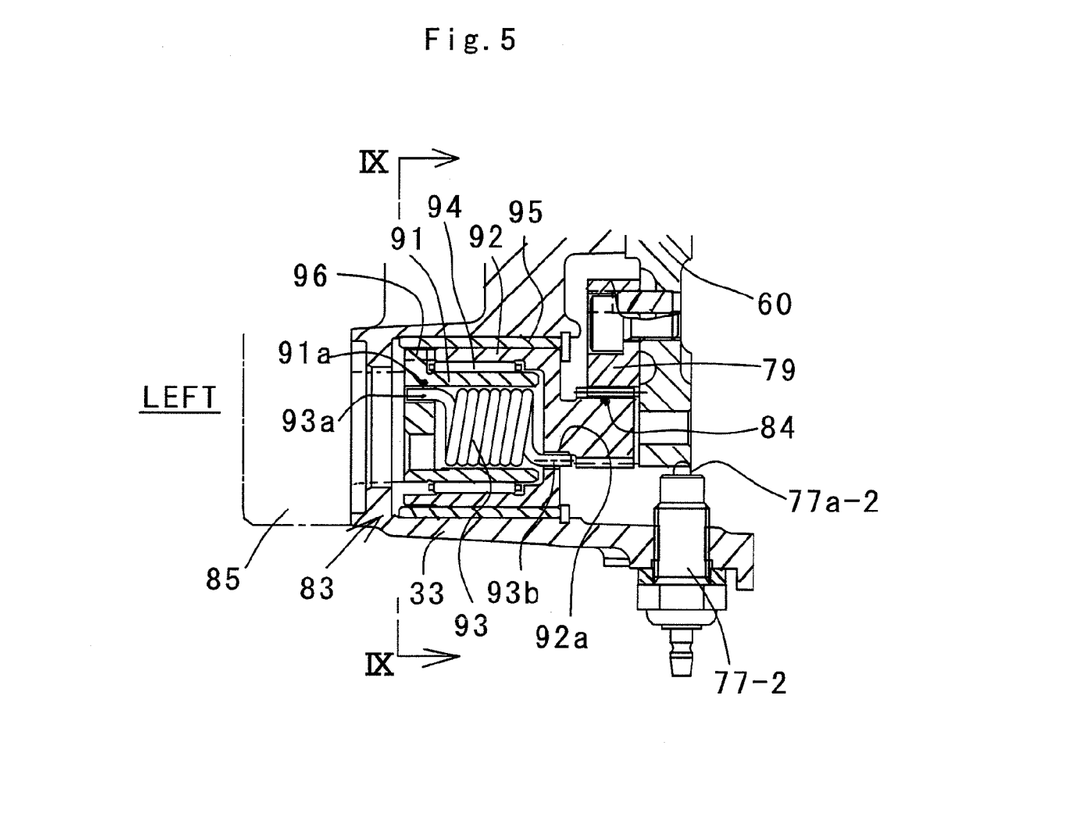
FIG. 5 is an enlarged horizontal sectional view of the waiting mechanism.

FIG. 4 is an exploded perspective view of the waiting mechanism 83, and FIG. 5 is an enlarged horizontal sectional view of the waiting mechanism 83. In FIG. 4, the waiting mechanism 83 has, on the same axis O2, a drive cylindrical shaft 91 coupled to the output shaft 85d (FIG. 3) of the electric actuator 85, a driven cylindrical shaft 92 formed integrally with the output gear 84, a coil spring 93, and a bearing or bearing metal 94. The driven cylindrical shaft 92 is fitted onto an outer circumferential surface of the drive cylindrical shaft 91 so as to be relatively rotatably fitted via the bearing metal 94, and the coil spring 93 is arranged in the drive cylindrical shaft 91.

In FIG. 5, the driven cylindrical shaft 92 is rotatably supported via a bearing metal 95 on an inner circumferential surface of a boss portion of the reduction gear case 33. One end 93a of the coil spring 93 engages with a notch 91a of the drive cylindrical shaft 91, and the other end 93b of the coil spring 93 engages with a notch 92a of the driven cylindrical shaft 92. The coil spring 93 has a function that can temporarily accumulate the operating power from the electric actuator 85. However, the waiting mechanism 83 includes a waiting action restricting mechanism constituted by a restricting projection 96 and a restricting notch 97 (FIG. 4). Thereby, the operating power can be temporarily accumulated only when the shift lever 60 is moved from the first position of FIG. 6 to the second position of FIG. 7 in a direction indicated by an arrow R1 and only when the shift lever 60 is moved from the second position of FIG. 7 to the third position of FIG. 8 in the direction indicated by the arrow R1. In other words, the operating power cannot be accumulated by the restricting mechanism when the shift lever 60 is rotated from the third position of FIG. 8 to the second position of FIG. 7 in a direction indicated by an arrow R2 and when the shift lever 60 is rotated from the second position of FIG. 7 to the first position of FIG. 6 in the direction indicated by the arrow R2.

In FIG. 4, when the restricting mechanism will be specifically described, the restricting projection 96 is formed at one end in an axial direction of the drive cylindrical shaft 91 and projects outward in a radial direction and the restricting notch 97 is formed at one end in an axial direction of the driven cylindrical shaft 92.

Figure 9:
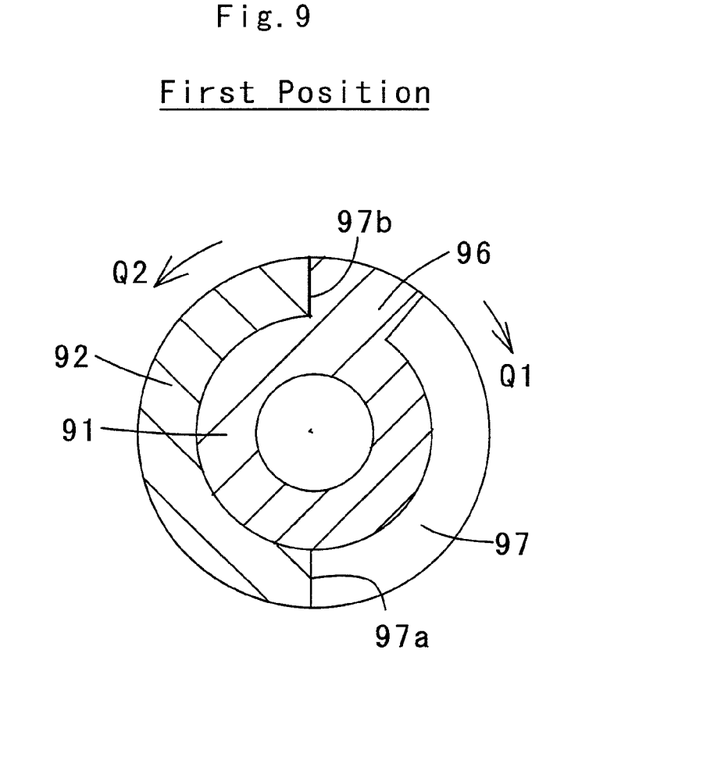
FIG. 9 is a functional view showing a condition of a regulating mechanism of the waiting mechanism when the shift lever is in the first position of FIG. 6.

FIG. 9 shows a condition of the restricting projection 96 and the restricting notch 97 when the shift lever 60 is in the first position. In the condition of FIG. 9, the restricting projection 96 is opposite an end face 97a in a direction indicated by an arrow Q1 of the restricting notch 97 by having play at a predetermined angle and is abutted onto an end face 97b in a direction indicated by an arrow Q2 of the restricting notch 97 by a fixed force by a spring force of the coil spring 93. In other words, when the waiting mechanism 83 is assembled, the coil spring 93 is twistably attached so that the drive cylindrical shaft 91 having the restricting projection 96 is relatively biased in the direction indicated by the arrow Q2 to the driven cylindrical shaft 92, and with this, the restricting projection 96 is usually abutted onto the end face 97b in the direction indicated by the arrow Q2 of the restricting notch 97 by the spring force of the coil spring 93 of FIG. 3.

In the case that the shift lever 60 in the condition of FIG. 6 or 7 is rotated in the direction indicated by the arrow R1, when end faces of the dog teeth 70 and 71 of FIG. 2 are abutted or end faces of the spline teeth 53 and 54 are abutted, the drive cylindrical shaft 91 of FIG. 4 is rotated in the direction indicated by the arrow Q1 relative to the driven cylindrical shaft 92, so that the coil spring 93 is twisted to enable the operating power from the electric actuator 85 (FIG. 2) to be temporarily accumulated in the coil spring 93. On the other hand, when the shift lever 60 is rotated from the condition of FIGS. 8 and 7 in the direction indicated by the arrow R2, the restricting projection 96 is abutted onto the end face 97*b* of the restricting notch 97, so that the drive cylindrical shaft 91 and the driven cylindrical shaft 92 are always integrally rotated in the direction indicated by the arrow Q2. In other words, the operating power cannot be accumulated in the coil spring 93.

[In the Two-Wheel-Chive and Unlocked Condition]

When the two-wheel-drive/four-wheel-drive switching mechanism 31 of FIG. 2 is in the two-wheel-drive condition and the differential lock mechanism 39 is in the unlocked condition, like FIG. 6, the shift lever 60 is located in the first position, the first drive pin 56*a* is located in the unlock position A1, and the second drive pin 74*a* is located in the two-wheel-drive position B1. In other words, the inner spline teeth 54 and the outer spline teeth 53 of the differential lock mechanism 39 shown in FIG. 2 do not engage with each other, and both the dog teeth 70 and 71 of the two-wheel-drive/four-wheel-drive switching mechanism 31 do not engage with each other. And, the restricting mechanism of the waiting mechanism 83 is in the condition of FIG. 9.

In addition, in FIG. 6, the projection 78 of the shift lever 60 is abutted onto the detection pin 77*a*-1 of the first position sensor 77-1, and with this, the meter displays that the two-wheel-drive/four-wheel-drive switching mechanism 31 is in the two-wheel-drive condition and the differential lock mechanism 39 is in the unlocked condition.

[A Switching Operation from the Two-Wheel-Drive Condition to the Four-Wheel-Drive Condition]

Like FIG. 2, when the differential lock mechanism 39 is maintained in the unlocked condition and the two-wheel-drive/four-wheel-drive switching mechanism 31 is switched from the two-wheel-drive condition to the four-wheel-drive condition, the electric actuator 85 is driven to rotate the waiting mechanism 83 in the direction indicated by the arrow Q1 of FIG. 4, so that the shift lever 60 is rotated from the first position of FIG. 6 to the second position of FIG. 7 in the direction indicated by the arrow R1 via the output gear 84 (FIG. 4) and the sector gear 79 (FIG. 3). The first drive pin 56*a* is maintained in the unlock position A1, and the second drive pin 74*a* is moved from the two-wheel-drive position B1 to the four-wheel-drive position B2 in a direction indicated by an arrow E2 (rearward) by an action of the second guide groove 75, so that both the dog teeth 70 and 71 engage with each other in the two-wheel-drive/four-wheel-drive switching mechanism 31 of FIG. 2.

At the time of this operation, when the end faces of the dog teeth 70 and 71 of the two-wheel-drive/four-wheel-drive switching mechanism 31 are abutted to each other, a waiting action of the waiting mechanism 83 is exerted. In other words, only the drive cylindrical shaft 91 is rotated from the condition shown in FIG. 9 in the direction indicated by the arrow Q1, and the driven cylindrical shaft 92 is maintained in a stopped condition, so that the waiting mechanism 83 is brought into the condition of FIG. 10. With this, the coil spring 93 of FIG. 3 is twisted to accumulate the operating power from the electric actuator 85.

Figure 10:
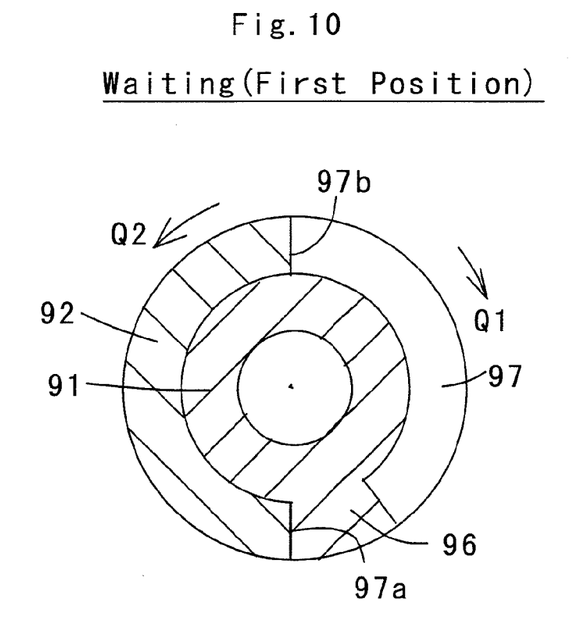
FIG. 10 is a functional view of the regulating mechanism of the waiting mechanism when a waiting action is produced at the time of a switching operation from the condition of FIG. 9 to the four-wheel-drive condition.
Figure 11:
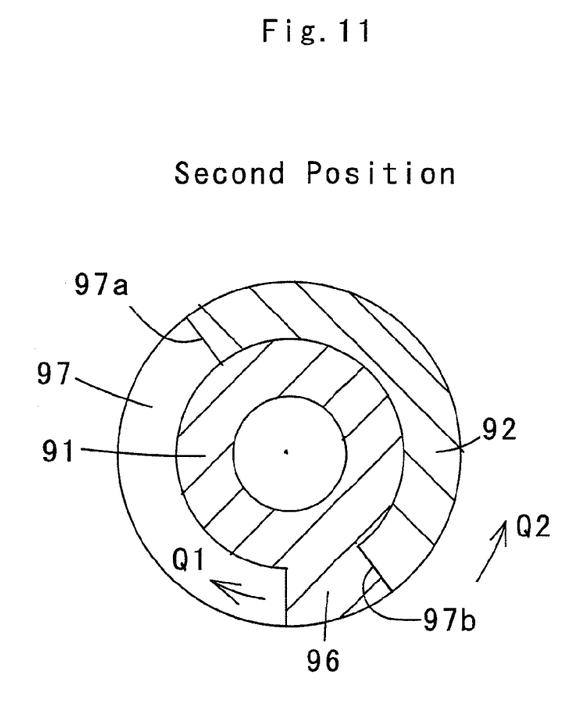
FIG. 11 is a functional view showing a condition of the regulating mechanism of the waiting mechanism when the shift lever is in the second position of FIG. 7.

At the time of the waiting action of FIG. 10, when both the dog teeth 70 and 71 of the two-wheel-drive/four-wheel-drive switching mechanism 31 are relatively rotated to reach an engageable relative position, the driven cylindrical shaft 92 is rotated at a predetermined angle in the direction indicated by the arrow Q1 relative to the drive cylindrical shaft 91 by the operating power accumulated in the coil spring 93, and with this, the shift lever 60 is moved from the first position of FIG. 6 to the second position of FIG. 7 in the direction indicated by the arrow R1. In other words, as shown in FIG. 2, both the dog teeth 70 and 71 of the two-wheel-drive/four-wheel-drive switching mechanism 31 engage with each other, so that the two-wheel-drive/four-wheel-drive switching mechanism 31 is automatically switched from the two-wheel-drive condition to the four-wheel-drive condition.

When the shift lever 60 reaches the second position of FIG. 7, the projection 78 of the shift lever 60 is abutted onto the detection pin 77*a*-2 of the second position sensor 77-2, and with this, the meter displays that the two-wheel-drive/four-wheel-drive switching mechanism 31 is in the four-wheel-drive condition and the differential lock mechanism 39 is in the unlocked condition.

[A Switching Operation from the Unlocked Condition to the Locked Condition in the Four-Wheel-Drive Condition]

When the four-wheel-drive condition is maintained and the differential lock mechanism 39 is switched from the unlocked condition to the locked condition, the electric actuator 85 is driven to further rotate the waiting mechanism 83 in the direction indicated by the arrow Q1 of FIG. 4, so that the shift lever 60 is rotated from the second position of FIG. 7 to the third position of FIG. 8 in the direction indicated by the arrow R1 via the output gear 84 and the sector gear 79. The second drive pin 74*a* is maintained in the four-wheel-drive position, and the first drive pin 56*a* is moved from the unlock position A1 to the lock position A2 by an action of the first guide groove 58, so that the inner spline teeth 54 and the outer spline teeth 53 of FIG. 2 engage with each other.

At the time of this operation, when the end faces in an axial direction of the inner spline teeth 54 and the outer spline teeth 53 are abutted onto each other, the waiting action of the waiting mechanism 83 is exerted. In other words, only the drive cylindrical shaft 91 is rotated from the condition shown in FIG. 11 in the direction indicated by the arrow Q1, and the driven cylindrical shaft 92 is maintained in the stopped condition, so that the waiting mechanism 83 is brought into the condition of FIG. 12. With this, the coil spring 93 of FIG. 3 is twisted to accumulate the operating power from the electric actuator 85 in the coil spring 93.

Figure 12:
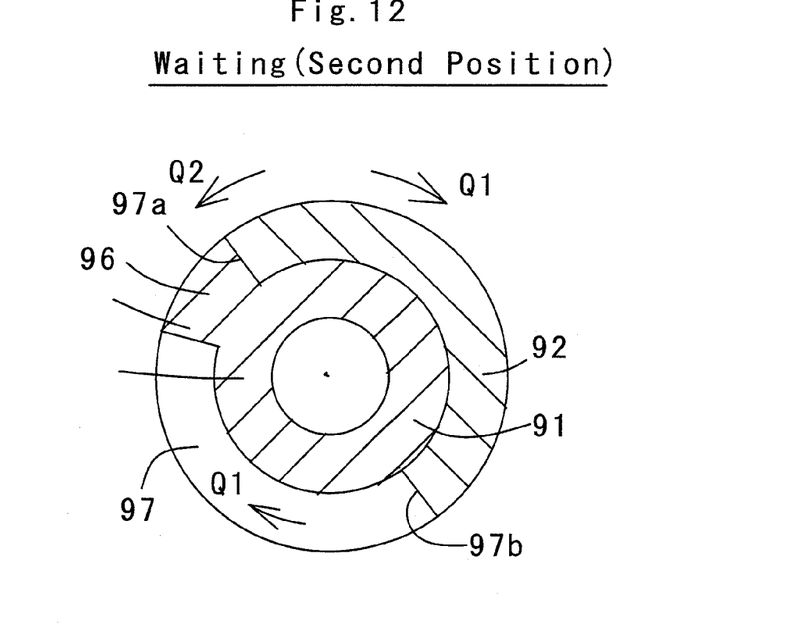
FIG. 12 is a functional view of the regulating mechanism of the waiting mechanism when the waiting action is produced at the time of a switching operation from the condition of FIG. 11 to the locked condition.
Figure 13:
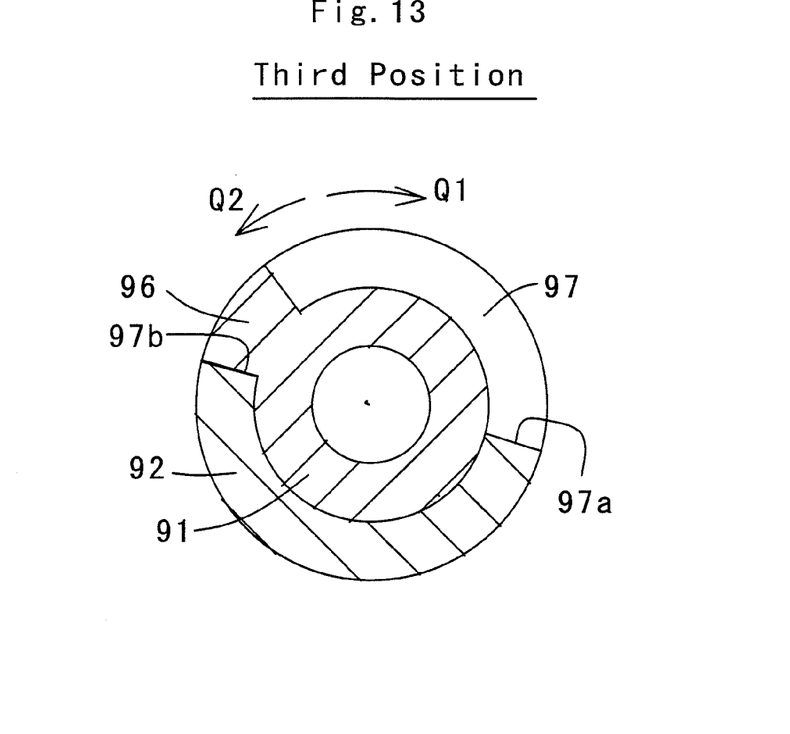
FIG. 13 is a functional view showing a condition of the regulating mechanism of the waiting mechanism when the shift lever is in the third position of FIG. 8.

At the time of the waiting action of FIG. 12, when the inner spline teeth 54 and the outer spline teeth 53 of the differential lock mechanism 39 of FIG. 2 are relatively rotated to reach the engageable relative position, as shown in FIG. 13, the driven cylindrical shaft 92 is rotated at a predetermined angle in the direction indicated by the arrow Q1 relative to the drive cylindrical shaft 91 by the operating power accumulated in the coil spring 93, so that the differential lock mechanism 39 is automatically switched from the unlocked condition to the locked condition. In other words, both the spline teeth 53 and 54 of the differential lock mechanism 39 of FIG. 2 are brought into the engaged condition.

As shown in FIG. 8, when the shift lever 60 reaches the third position, the projection 78 is abutted onto the detection pin 77*a*-3 of the third position sensor 77-3, and with this, the meter displays that the two-wheel-drive/four-wheel-drive switching mechanism 31 is in the four-wheel-drive condition and the differential lock mechanism 39 is in the locked condition.

[Switching from the Locked Condition to the Unlocked Condition]

When the shift lever 60 is returned from the third position of FIG. 8 to the second position of FIG. 7 to release lock of the differential lock mechanism 39, the output shaft 85*d* of the electric actuator 85 of FIG. 3 is rotated in the direction indicated by the arrow Q2, the drive cylindrical shaft 91, the driven cylindrical shaft 92, and the output gear 84 of the waiting mechanism 83 are rotated in the direction indicated by the arrow Q2, and the shift lever 60 is rotated from the third position of FIG. 8 in the direction indicated by the arrow R2 via the sector gear 79. With this, engagement of both the spline teeth 53 and 54 of the differential lock mechanism 39 is released.

At the time of this operation, the restricting projection 96 and the end face 97b in the direction indicated by the arrow Q2 of the restricting notch 97 are abutted onto each other all the time, so that the waiting action of the waiting mechanism 83 is not produced. In other words, the first drive pin 56a is moved in the direction indicated by the arrow D2 so as to release the engagement of the inner spline teeth 54 and the outer spline teeth 53 of the differential lock mechanism 39 of FIG. 2, so that no situations exerting the waiting action are caused.

[Switching from the Four-Wheel-Drive Condition to the Two-Wheel-Drive Condition]

When the shift lever 60 is returned from the second position of FIG. 7 to the first position of FIG. 6 to return the two-wheel-drive/four-wheel-drive switching mechanism 31 from the four-wheel-drive condition to the two-wheel-drive condition, the output shaft 85d of the electric actuator 85 of FIG. 3 is rotated in the direction indicated by the arrow Q2, the drive cylindrical shaft 91, the driven cylindrical shaft 92, and the output gear 84 of the waiting mechanism 83 are rotated in the direction indicated by the arrow Q2, and the shift lever 60 is rotated from the second position of FIG. 7 in the direction indicated by the arrow R2 via the sector gear 79. With this, engagement of both the dog teeth 70 and 71 of the two-wheel-drive/four-wheel-drive switching mechanism 31 is released. At the time of this operation, as in the lock release operation, the waiting action of the waiting mechanism 83 is not produced. In other words, the second drive pin 74a is moved so as to release the engagement of the dog teeth 70 and 71 of the two-wheel-drive/four-wheel-drive switching mechanism 31 of FIG. 2, so that no situations exerting the waiting action are caused.

[A Summary of the Effects of the Embodiment]

(1) The waiting mechanism 83 enables the waiting action only when the differential lock mechanism 39 is switched from the unlocked condition to the locked condition and only when the two-wheel-drive/four-wheel-drive switching mechanism 31 is switched from the two-wheel-drive condition to the four-wheel-drive condition. In other words, the differential lock mechanism 39 enables the waiting action only at the time of the engaging operation of both the spline teeth 53 and 54, and the two-wheel-drive/four-wheel-drive switching mechanism 31 enables the waiting action only at the time of the engaging operation of both the dog teeth 70 and 71, so that the electric actuator 85 and the coil spring 93 of the waiting mechanism 83 can be reduced in volume and size.

(2) On the other hand, the differential lock mechanism 39 is switched from the locked condition to the unlocked condition and when the two-wheel-drive/four-wheel-drive switching mechanism 31 is switched from the four-wheel-drive condition to the two-wheel-drive condition, the operating power of the coil spring 93 is not accumulated, so that a quick-response and immediate operation can be performed.

(3) The differential lock mechanism 39 uses the engagement of the inner spline teeth 54 and the outer spline teeth 53, so that a relative rotation angle between the inner spline teeth 54 and the outer spline teeth 53 by the coil spring 93 necessary for lock at the time of the waiting action can be smaller and a smooth switching operation can be ensured.

(4) The differential lock mechanism 39 and the two-wheel-drive/four-wheel-drive switching mechanism 31 are operated using the shared electric actuator 85 and the shared waiting mechanism 83, so that the number of components for operating the respective mechanisms can be reduced.

(5) The shared shift lever 60 has the first guide groove 58 for operating the differential lock mechanism and the second guide groove 75 for the two-wheel-drive/four-wheel-drive switching at both ends in a radial direction, so that in this point, the size of the operating mechanism and the number of components can be reduced.

(6) The waiting mechanism 83 has, on the same axis O2, the drive cylindrical shaft 91, the driven cylindrical shaft 92, and the coil spring 93 arranged in the drive cylindrical shaft 91, so that the waiting mechanism 83 itself can be smaller.

(7) In the waiting mechanism 83, the arcuate restricting notch 97 is formed in the driven cylindrical shaft 92, the restricting projection 96 for engaging with the restricting notch 97 so as to be movable in a circumferential direction is formed on the drive cylindrical shaft 91, and only when the drive cylindrical shaft 91 is switch-operated from the unlocked condition to the locked condition or from the two-wheel-drive condition to the four-wheel-drive condition, the restricting projection 96 is moved in the circumferential direction relative to the notch 97 to compress the coil spring 93, thereby restricting the direction in which the waiting action is exerted by the coil spring 93, by the arcuate restricting notch 97 and the restricting projection 96, so that the configuration of the waiting mechanism 83 can be simplifier.

(8) The waiting mechanism 83 is arranged outside the electric actuator 85, so that a general-purpose product can be used as the electric actuator 85.

(9) The potentiometer for detecting the amount of rotation is provided on the rotating member arranged in the electric actuator 85, so that the amount of operating power from the electric actuator to the waiting mechanism 83 can be easily detected.

(10) The first position sensor 77-1 for detecting a rotation position of the shift lever 60 when the two-wheel-drive/four-wheel-drive switching mechanism 31 is in the two-wheel-drive condition and the differential mechanism 39 is in the unlocked condition, the second position sensor 77-2 for detecting a rotation position of the shift lever 60 when the two-wheel-drive/four-wheel-drive switching mechanism 31 is in the four-wheel-drive condition and the differential mechanism is in the unlocked condition, and the third position sensor 77-3 for detecting a rotation position of the shift lever 60 when the two-wheel-drive/four-wheel-drive switching mechanism 31 is in the four-wheel-drive condition and the differential mechanism is in the locked condition are provided outward in the radial direction of the shift lever 60, so that the three conditions of the differential lock mechanism 39 and the two-wheel-drive/four-wheel-drive switching mechanism 31 can be precisely detected.

[Other Embodiments]

(1) In the above embodiment, the engine (internal-combustion engine) is provided as the driving source for generating driving force for driving the vehicle, but the present invention is also applicable to a vehicle equipped with an electric motor, a hydraulic motor, or a diesel engine, as the driving source.

(2) In the above embodiment, the present invention is applied to the differential lock mechanism for front wheels and the two-wheel-drive/four-wheel-drive switching mechanism, but the present invention is also applicable to the differential lock mechanism for rear wheels and the two-wheel-drive/four-wheel-drive switching mechanism.

(3) An electric actuator into which the potentiometer is not incorporated can also be provided.

(4) As the elastic member of the waiting mechanism 83, in addition to the coil spring, rubber and an air spring can also be adopted.

(5) The present invention is not limited to the configuration of the above embodiment and includes various modification examples contemplated in the scope without departing from the contents described in the claims.

What is claimed is:

1. A power switching device for vehicle, the power switching device comprising:
    an engaging mechanism for connecting and disconnecting a pair of rotating members arranged on a driving force transmission passage from a driving source to wheels;
    an operating mechanism for switch-operating the engaging mechanism between an engaged condition and a disengaged condition;
    an electric actuator for providing operating power to the operating mechanism; and
    a waiting mechanism having an elastic member for temporarily accumulating the operating power and then transmitting the operating power to the engaging mechanism;
    wherein the engaging mechanism has a pair of engage portions, each of the pair of rotating members having a respective one of the engage portions, the engaging mechanism being switchable between the engaged condition and the disengaged condition by moving one of the engage portions relative to the other engage portion in an axial direction of the rotating member;
    wherein the elastic member is incorporated into the waiting mechanism so that the elastic member can temporarily accumulate the operating power only when the engaging mechanism is switched from the disengaged condition to the engaged condition; and
    wherein the pair of rotating members are a differential case of a differential device and one of right and left axles.

2. A power switching device for vehicle, the power switching device comprising:
    an engaging mechanism for connecting and disconnecting a pair of rotating members arranged on a driving force transmission passage from a driving source to wheels;
    an operating mechanism for switch-operating the engaging mechanism between an engaged condition and a disengaged condition;
    an electric actuator for providing operating power to the operating mechanism; and
    a waiting mechanism having an elastic member for temporarily accumulating the operating power and then transmitting the operating power to the engaging mechanism;
    wherein the engaging mechanism has a pair of engage portions, each of the pair of rotating members having a respective one of the engage portions, the engaging mechanism being switchable between the engaged condition and the disengaged condition by moving one of the engage portions relative to the other engage portion in an axial direction of the rotating member;
    wherein the elastic member is incorporated into the waiting mechanism so that the elastic member can temporarily accumulate the operating power only when the engaging mechanism is switched from the disengaged condition to the engaged condition;
    wherein the engaging mechanism is a two-wheel-drive/four-wheel-drive switching mechanism arranged between a propeller shaft for front wheels or rear wheels and a final reduction gear for front wheels or rear wheels; and
    wherein the engaging mechanism being configured to bring the vehicle into a four-wheel-drive condition when the engaging mechanism is in the engaged condition and to bring the vehicle into a two-wheel-drive condition when the engaging mechanism is in the disengaged condition.

3. The power switching device for vehicle according to claim 2,
    wherein the pair of engage portions of the engaging mechanism are a pair of dog teeth projecting in an axial direction.

4. A power switching device for vehicle, the power switching device comprising:
    an engaging mechanism for connecting and disconnecting a pair of rotating members arranged on a driving force transmission passage from a driving source to wheels;
    an operating mechanism for switch-operating the engaging mechanism between an engaged condition and a disengaged condition;
    an electric actuator for providing operating power to the operating mechanism; and
    a waiting mechanism having an elastic member for temporarily accumulating the operating power and then transmitting the operating power to the engaging mechanism;
    wherein the engaging mechanism has a pair of engage portions, each of the pair of rotating members having a respective one of the engage portions, the engaging mechanism being switchable between the engaged condition and the disengaged condition by moving one of the engage portions relative to the other engage portion in an axial direction of the rotating member;
    wherein the elastic member is incorporated into the waiting mechanism so that the elastic member can temporarily accumulate the operating power only when the engaging mechanism is switched from the disengaged condition to the engaged condition;
    wherein two mechanisms of a differential lock mechanism and a two-wheel-drive/four-wheel-drive switching mechanism are provided as the engaging mechanism; and
    wherein the operating mechanism is configured to branch the operating power transmitted from the electric actuator into the differential lock mechanism and the two-wheel-drive/four-wheel-drive switching mechanism.

5. The power switching device for vehicle according to claim 4,
    wherein the operating mechanism has a shift lever having a first guide groove for engaging with a shift member for moving one of the engage portions of the differential lock mechanism and a second guide groove for engaging with a shift member for moving one of the engage portions of the two-wheel-drive/four-wheel-drive switching mechanism;
    wherein a first one of the first guide groove and the second guide groove is formed on an end face in a radial direction of the shift lever, and a second one of the first guide groove and the second guide groove is formed on an end face in an axial direction of the shift lever.

6. The power switching device for vehicle according to claim 5,
    wherein three rotation position sensors opposite the shift lever from outside in the radial direction are provided,
    wherein the three rotation position sensors include a first rotation position sensor for detecting a rotation position of the shift lever when the two-wheel-drive/four-wheel-drive switching mechanism is in the two-wheel-drive condition and the differential mechanism is in the unlocked condition, a second rotation position sensor for detecting a rotation position of the shift lever when the two-wheel-drive/four-wheel-drive switching mechanism is in the four-wheel-drive condition and the differential mechanism is in the unlocked condition, and a third rotation position sensor for detecting a rotation position of the shift lever when the two-wheel-drivefour-wheel-drive switching mechanism is in the four-wheel-drive condition and the differential mechanism is in the locked condition.

7. A power switching device for vehicle, the power switching device comprising:
    an engaging mechanism for connecting and disconnecting a pair of rotating members arranged on a driving force transmission passage from a driving source to wheels;
    an operating mechanism for switch-operating the engaging mechanism between an engaged condition and a disengaged condition;
    an electric actuator for providing operating power to the operating mechanism; and
    a waiting mechanism having an elastic member for temporarily accumulating the operating power and then transmitting the operating power to the engaging mechanism;
    wherein the engaging mechanism has a pair of engage portions, each of the pair of rotating members having a respective one of the engage portions, the engaging mechanism being switchable between the engaged condition and the disengaged condition by moving one of the engage portions relative to the other engage portion in an axial direction of the rotating member;
    wherein the elastic member is incorporated into the waiting mechanism so that the elastic member can temporarily accumulate the operating power only when the engaging mechanism is switched from the disengaged condition to the engaged condition; and
    wherein the elastic member of the waiting mechanism is a coil spring, the coil spring being arranged between a drive cylindrical shaft coupled to an output shaft of the electric actuator and a driven cylindrical shaft coupled to a rotational shaft of the operating mechanism so as to be substantially coaxial with the drive cylindrical shaft and the driven cylindrical shaft.

8. The power switching device for vehicle according to claim 7,
    wherein the drive cylindrical shaft is arranged inside the driven cylindrical shaft.

9. The power switching device for vehicle according to claim 7,
    wherein a first one of the drive cylindrical shaft and the driven cylindrical shaft is formed with an arcuate notch about a cylindrical shaft axis, and a second one of the drive cylindrical shaft and the driven cylindrical shaft is formed with a projection for engaging with the notch so as to be movable in a circumferential direction; and
    wherein only when the drive cylindrical shaft is operated from the disengaged condition to the engaged condition, the projection and the notch are relatively moved in the circumferential direction to compress the coil spring.

10. A power switching device for vehicle, the power switching device comprising:
    an engaging mechanism for connecting and disconnecting a pair of rotating members arranged on a driving force transmission passage from a driving source to wheels;
    an operating mechanism for switch-operating the engaging mechanism between an engaged condition and a disengaged condition;
    an electric actuator for providing operating power to the operating mechanism; and
    a waiting mechanism having an elastic member for temporarily accumulating the operating power and then transmitting the operating power to the engaging mechanism;
    wherein the engaging mechanism has a pair of engage portions, each of the pair of rotating members having a respective one of the engage portions, the engaging mechanism being switchable between the engaged condition and the disengaged condition by moving one of the engage portions relative to the other engage portion in an axial direction of the rotating member;
    wherein the elastic member is incorporated into the waiting mechanism so that the elastic member can temporarily accumulate the operating power only when the engaging mechanism is switched from the disengaged condition to the engaged condition; and
    wherein a potentiometer for detecting an amount of rotation is provided on a rotating member arranged in the electric actuator.

* * * * *